United States Patent
Kim et al.

(10) Patent No.: US 10,853,018 B2
(45) Date of Patent: Dec. 1, 2020

(54) MULTI-DISPLAY APPARATUS AND METHOD OF INSTALLING THE SAME

(71) Applicant: LG Display Co., Ltd., Seoul (KR)

(72) Inventors: Yongjoon Kim, Paju-si (KR); DuckSu Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/586,384

(22) Filed: Sep. 27, 2019

(65) Prior Publication Data

US 2020/0104090 A1 Apr. 2, 2020

(30) Foreign Application Priority Data

Sep. 28, 2018 (KR) .................. 10-2018-0116013

(51) Int. Cl.
*G06F 3/14* (2006.01)
*G06F 9/302* (2018.01)
*G09F 7/18* (2006.01)
*G06F 1/16* (2006.01)
*G09F 9/302* (2006.01)

(52) U.S. Cl.
CPC .............. *G06F 3/1446* (2013.01); *G09F 7/18* (2013.01); *G09F 9/3026* (2013.01); *G06F 1/1601* (2013.01)

(58) Field of Classification Search
CPC .... G06F 3/1431; G06F 3/1446; G06F 1/1601; G09F 9/3026; G09F 9/33; G09F 9/35; G09F 7/18; G09F 7/22; G09F 7/20; G09G 5/005; G09G 5/14; G09G 2340/0407; G09G 2300/026

See application file for complete search history.

(56) References Cited

U.S. PATENT DOCUMENTS

| | | | |
|---|---|---|---|
| 2008/0067312 A1* | 3/2008 | Allen | ............... F16M 13/02 248/317 |
| 2019/0307016 A1* | 10/2019 | Kwon | ............... G09F 9/302 |

FOREIGN PATENT DOCUMENTS

| | | | | |
|---|---|---|---|---|
| CN | 108107978 A | * | 6/2018 | |
| JP | 2005338531 A | * | 12/2005 | |
| JP | 2011221428 A | * | 11/2011 | |
| KR | 20100090831 A | * | 8/2010 | |
| WO | WO-2012141526 A2 | * | 10/2012 | ............ G09F 9/33 |

* cited by examiner

*Primary Examiner* — Darlene M Ritchie

(74) *Attorney, Agent, or Firm* — Birch, Stewart, Kolasch & Birch, LLP

(57) ABSTRACT

A multi-display apparatus including a main frame, a plurality of display modules arranged on the main frame, and a sub-frame coupled to each of the plurality of display modules. The sub-frame includes a rail portion and a hinge portion hingedly-coupled to the main frame. Each of the plurality of display modules includes a display panel, a back cover coupled to a rear surface of the display panel, and a movement guide fixed to the back cover and coupled to the rail portion a sliding manner.

20 Claims, 15 Drawing Sheets

[FIG. 1]
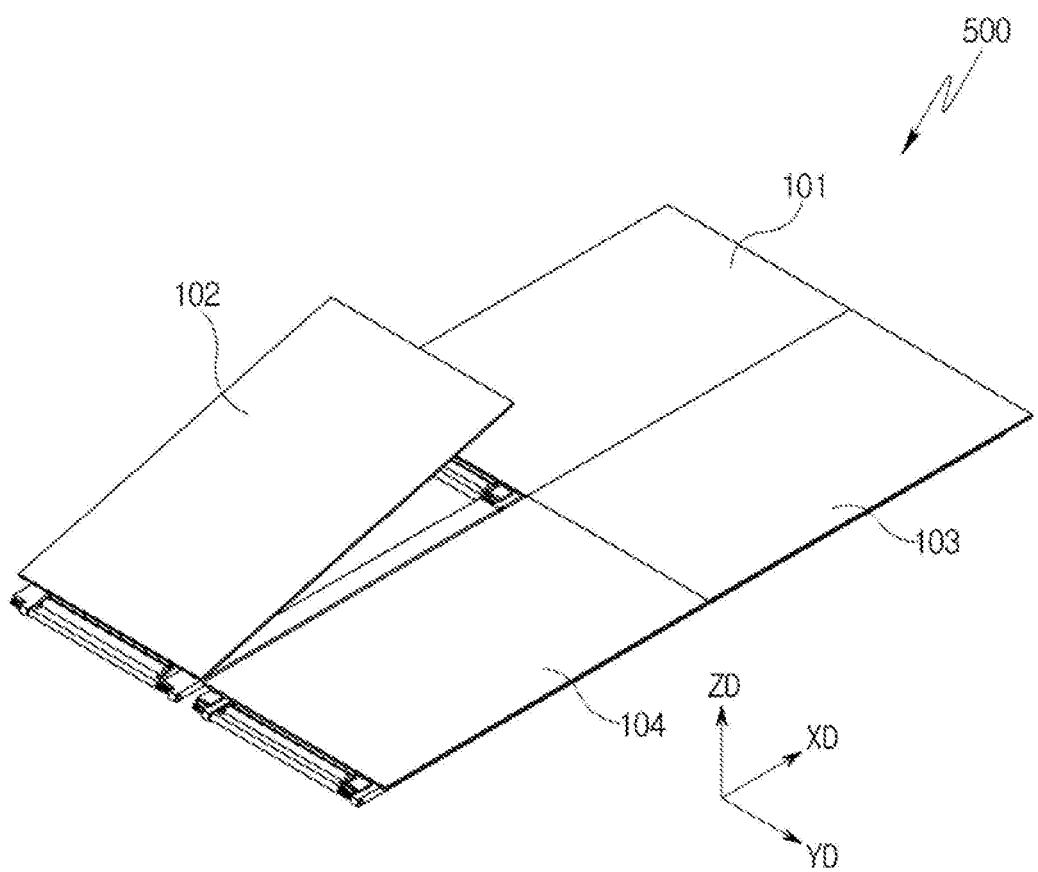

[FIG. 2]
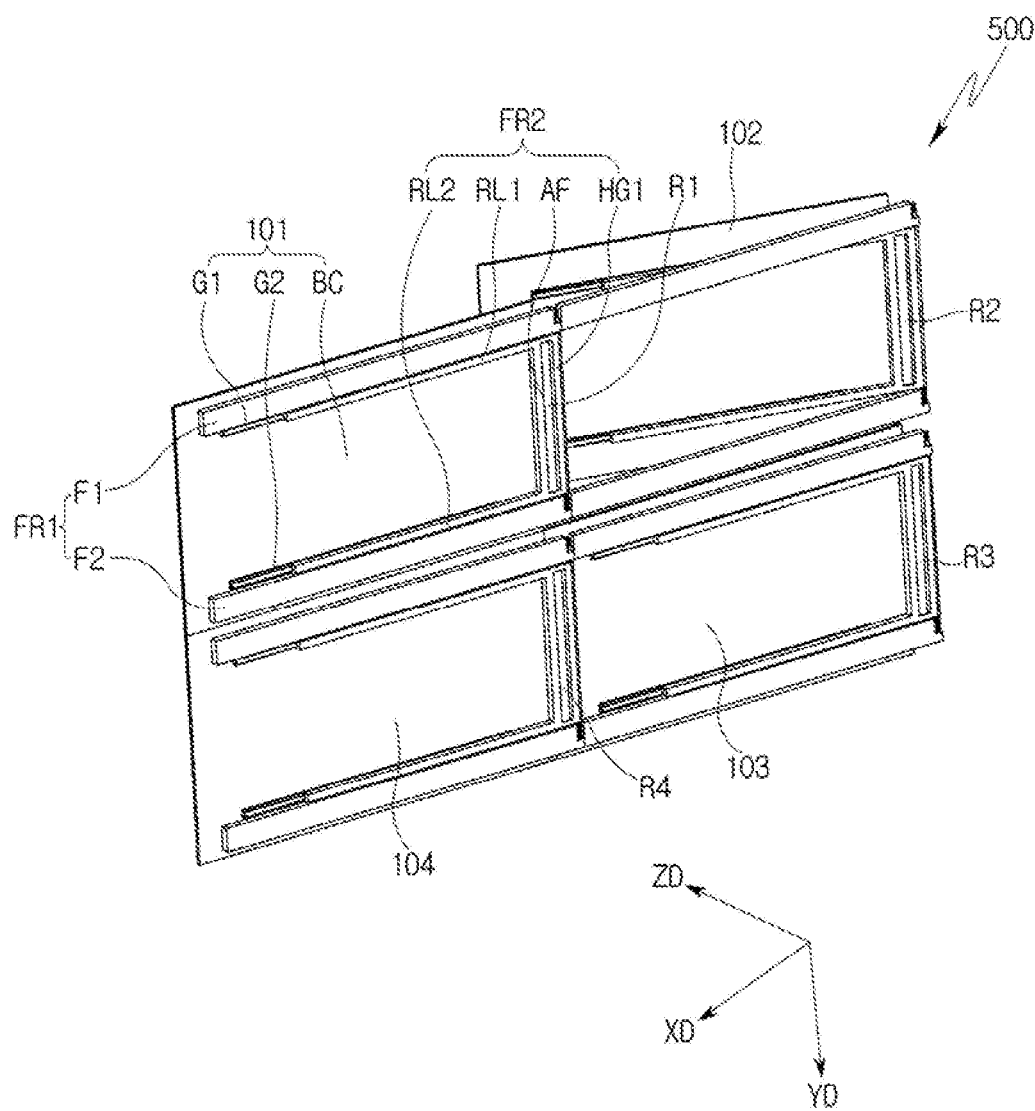

[FIG. 3]
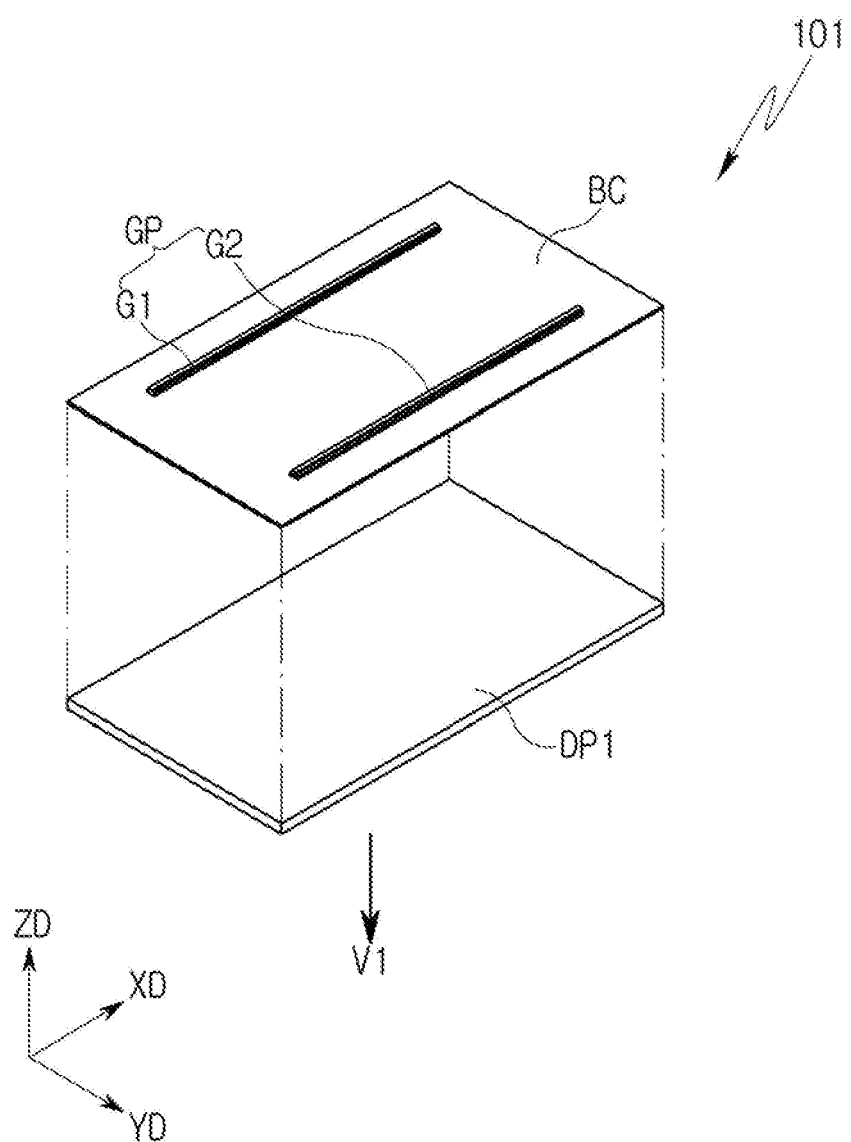

[FIG. 4A]
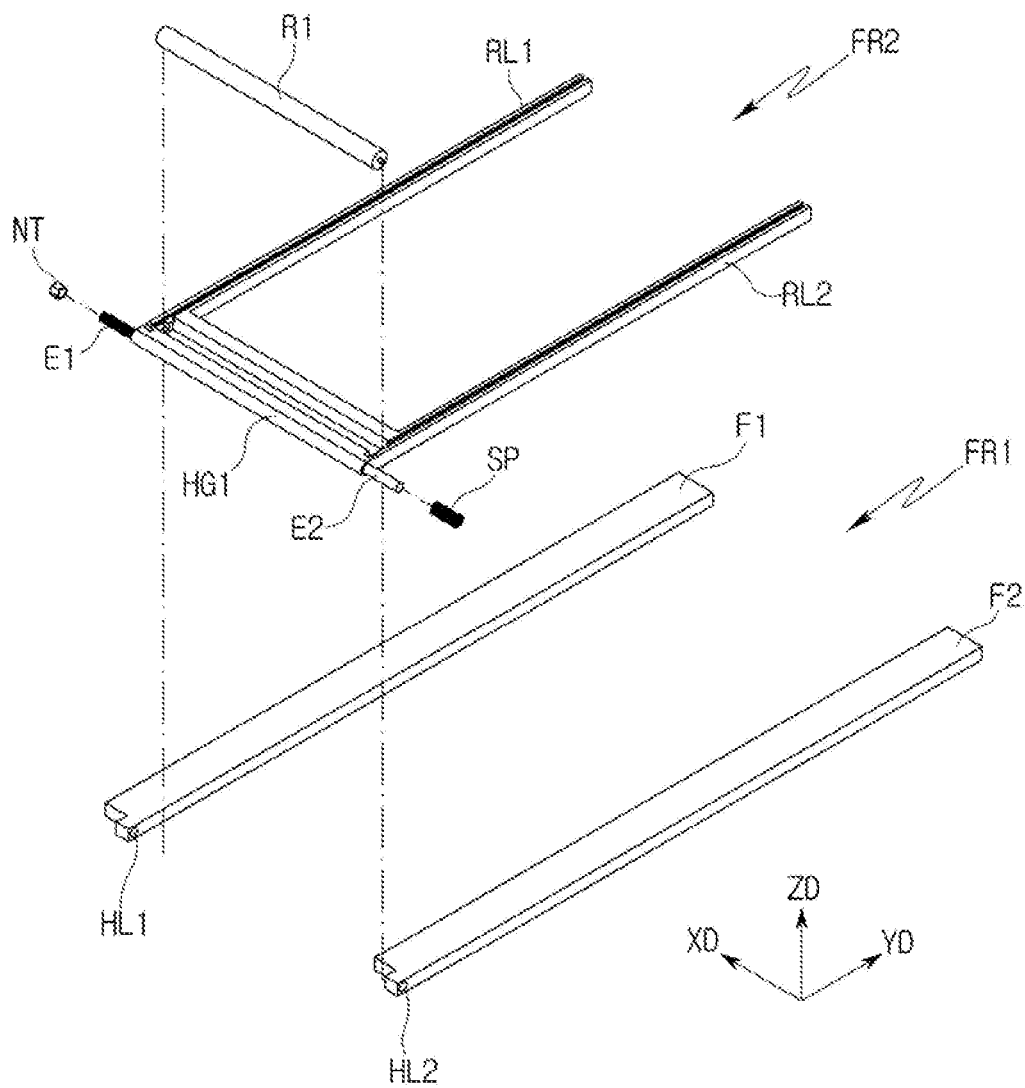

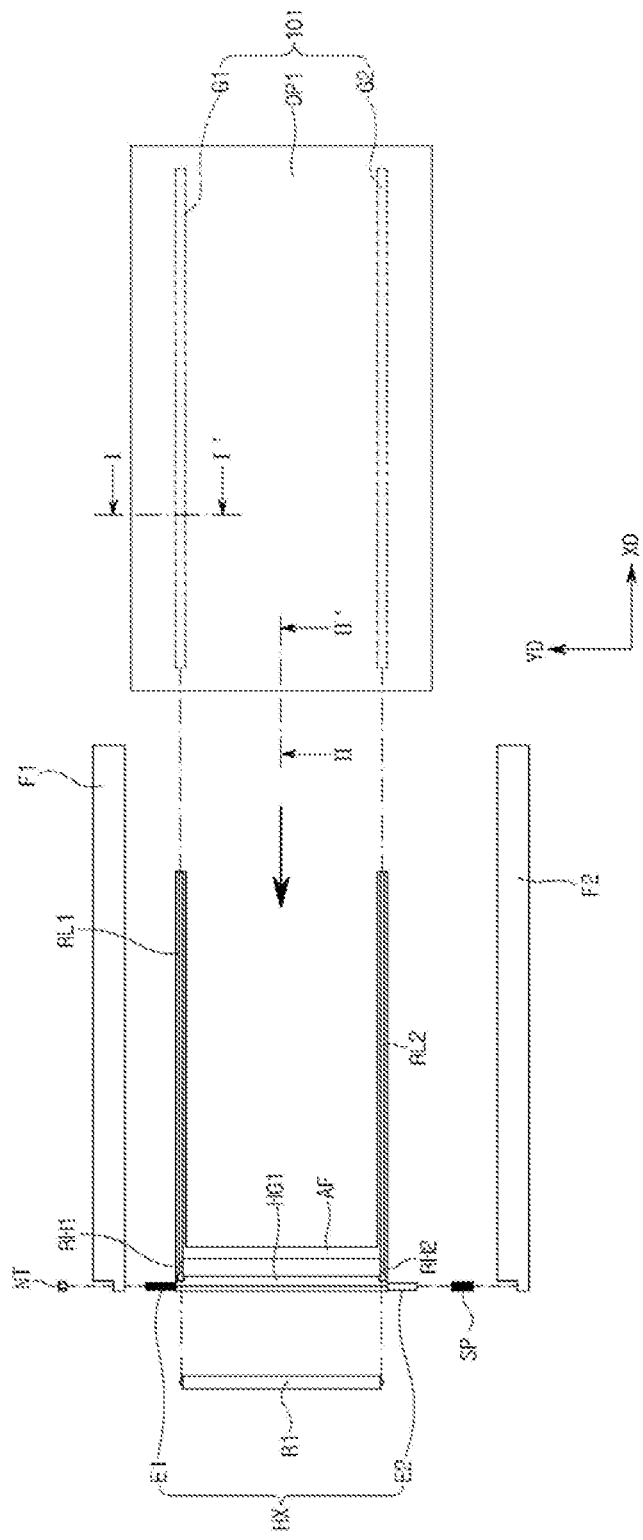
[FIG. 4B]

[FIG. 4C]
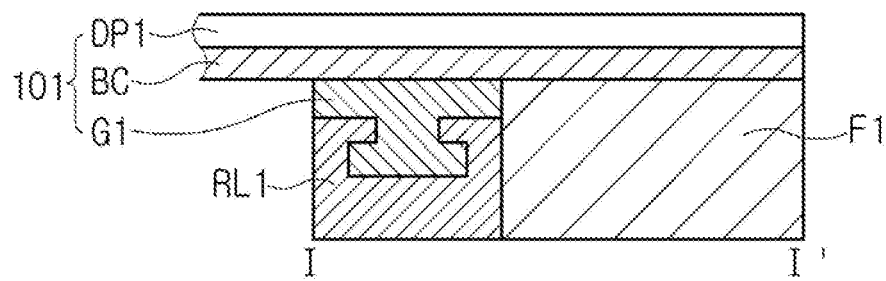
[FIG. 4D]
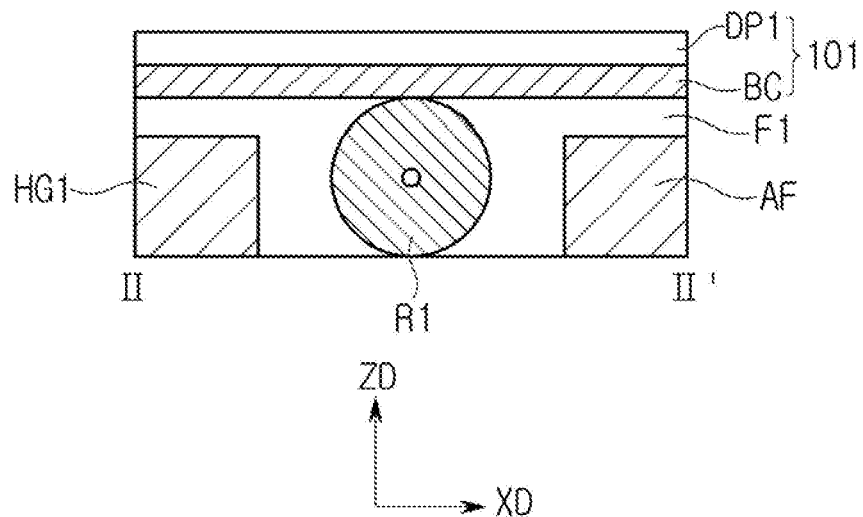

[FIG. 5]
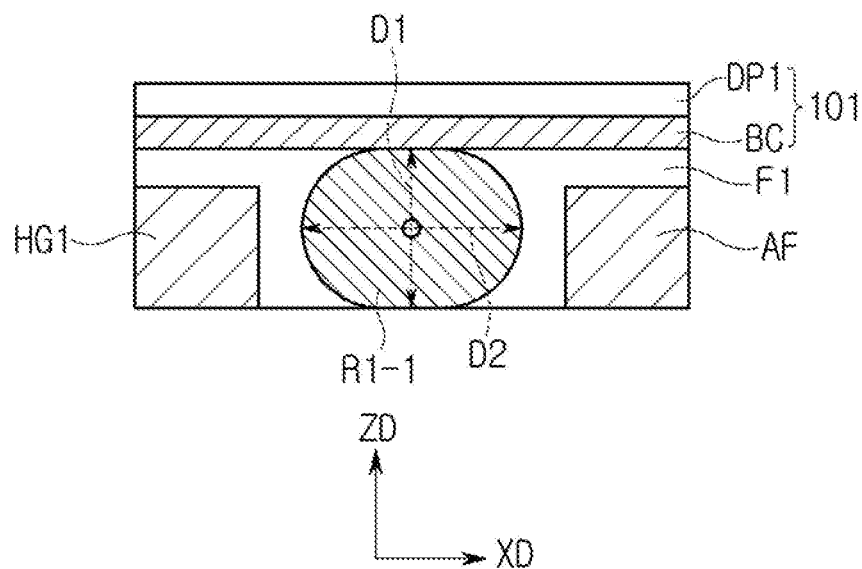
[FIG. 6A]
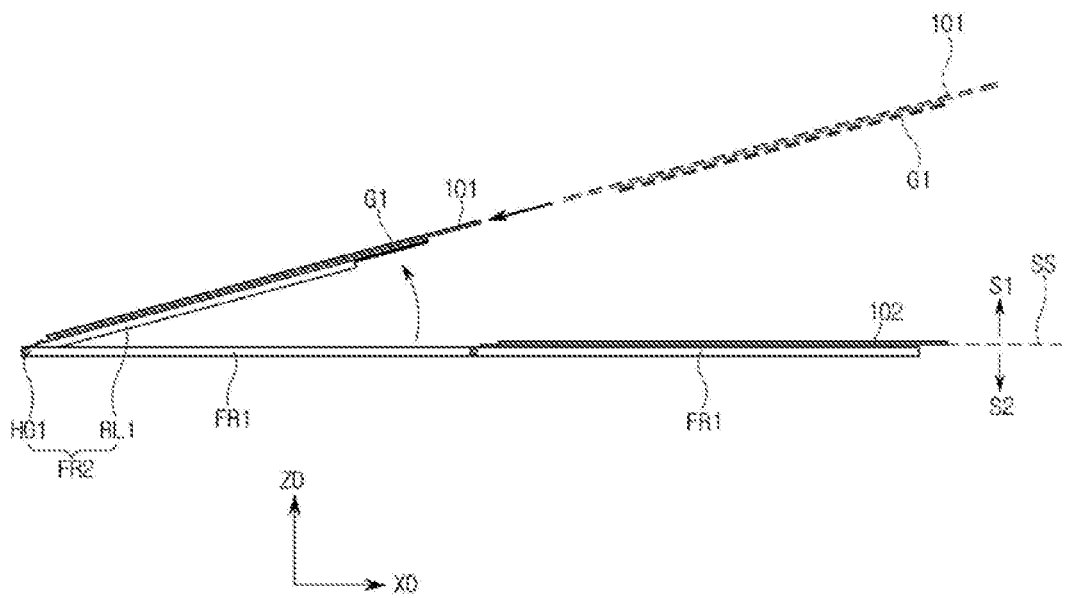

[FIG. 6B]
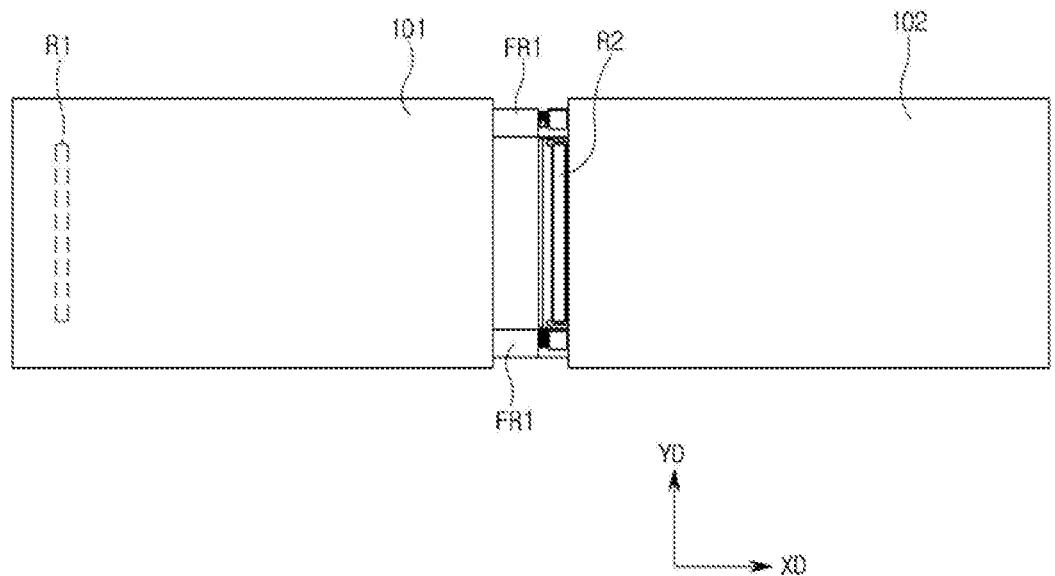
[FIG. 6C]
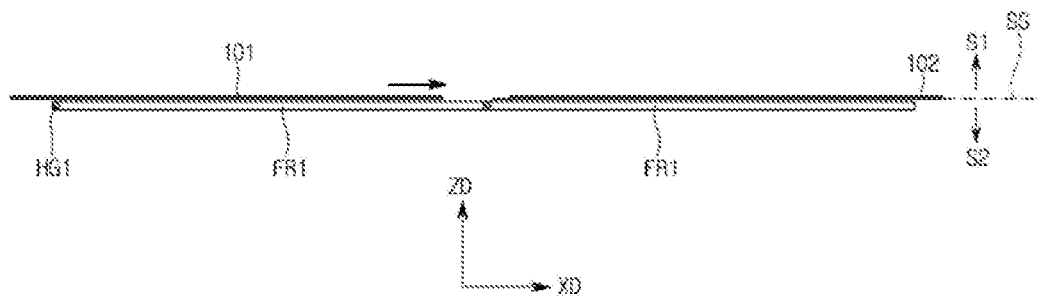

[FIG. 6D]
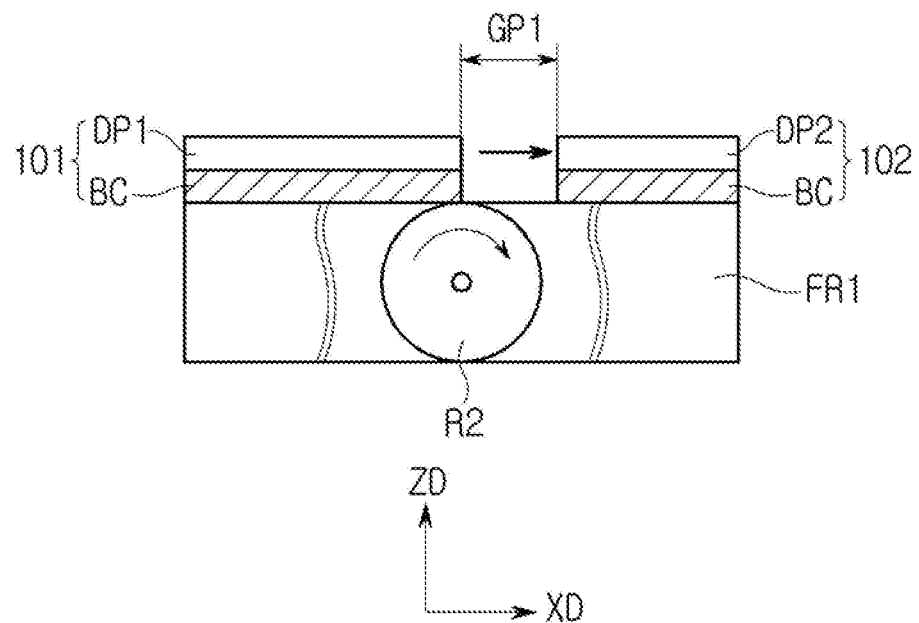
[FIG. 7A]
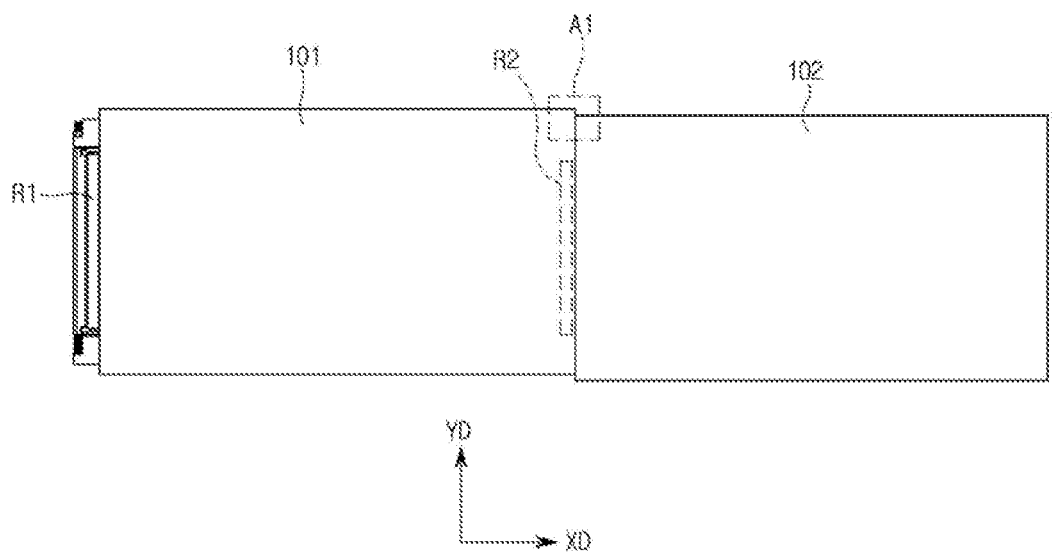

[FIG. 7B]
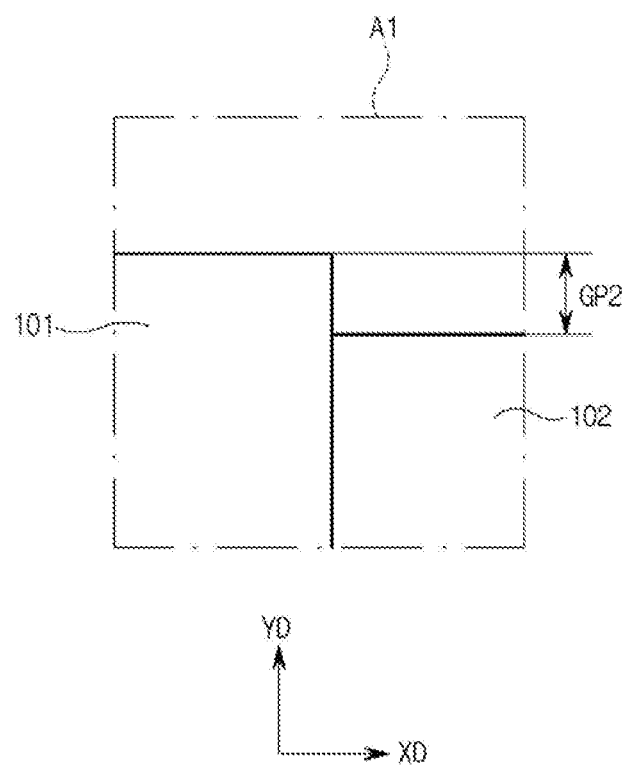

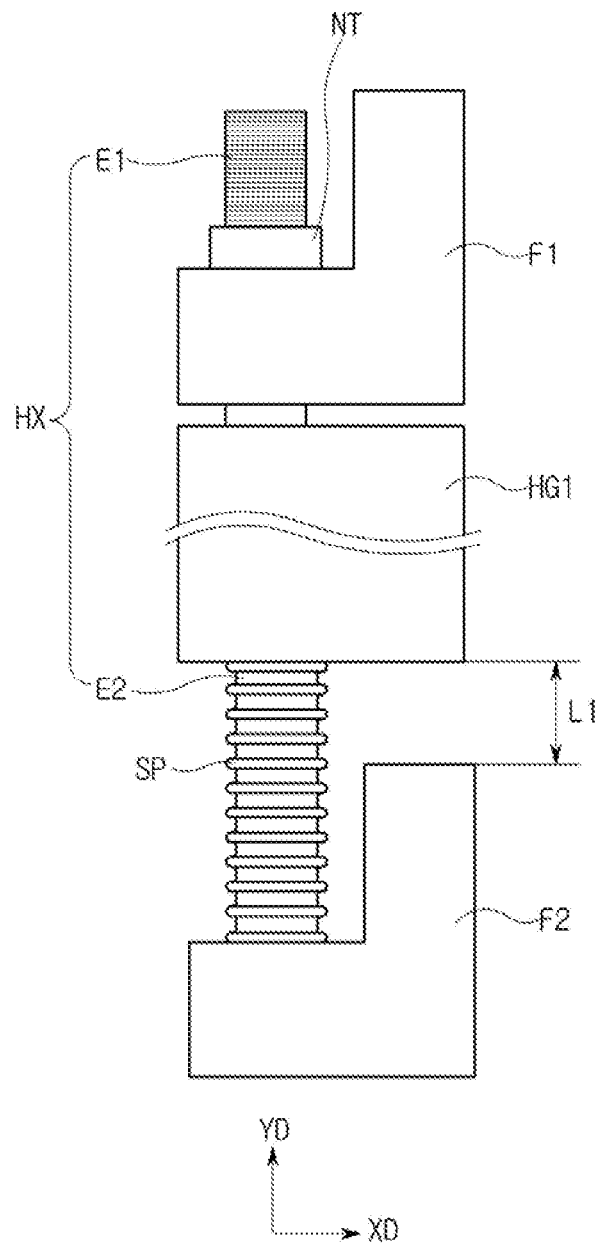
[FIG. 7C]

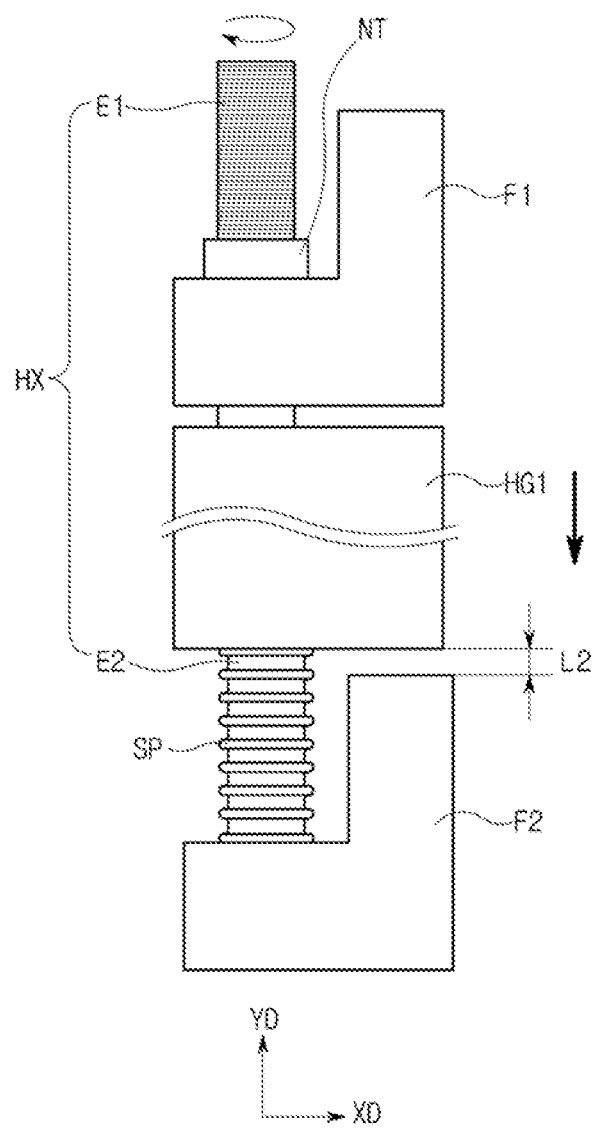
[FIG. 7D]

[FIG. 8A]
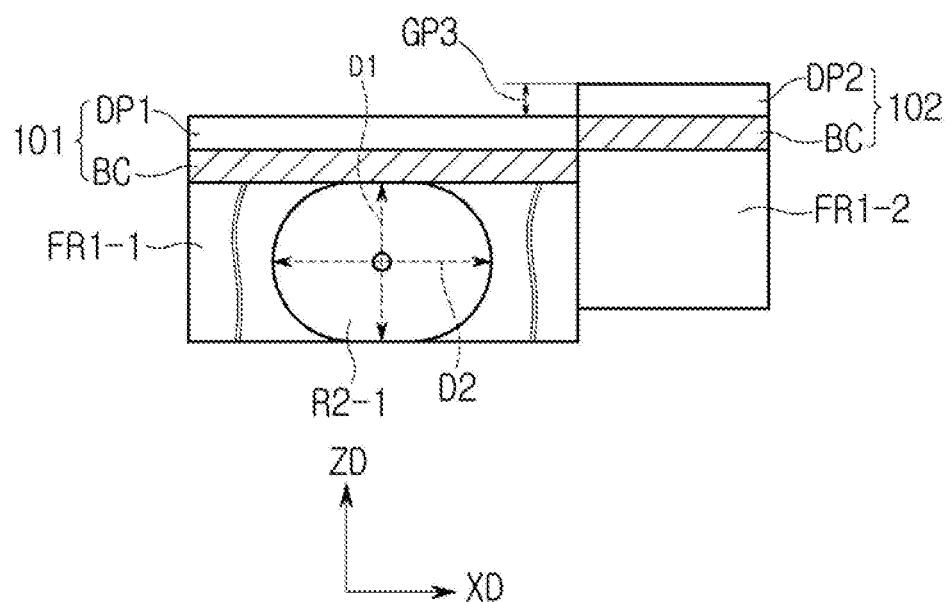
[FIG. 8B]
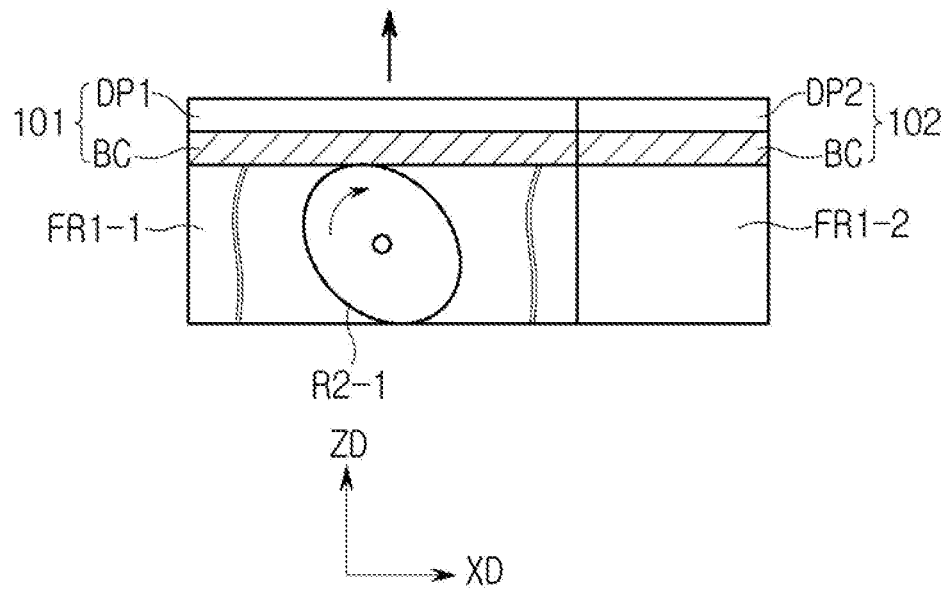

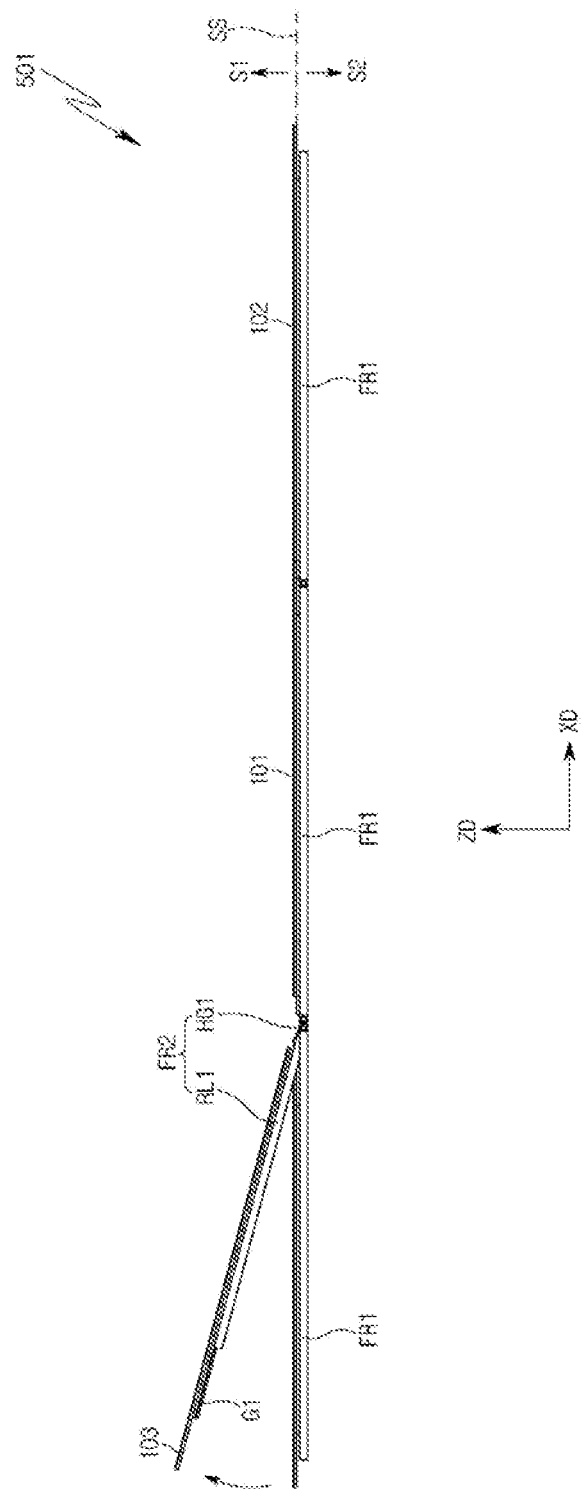
[FIG. 9A]

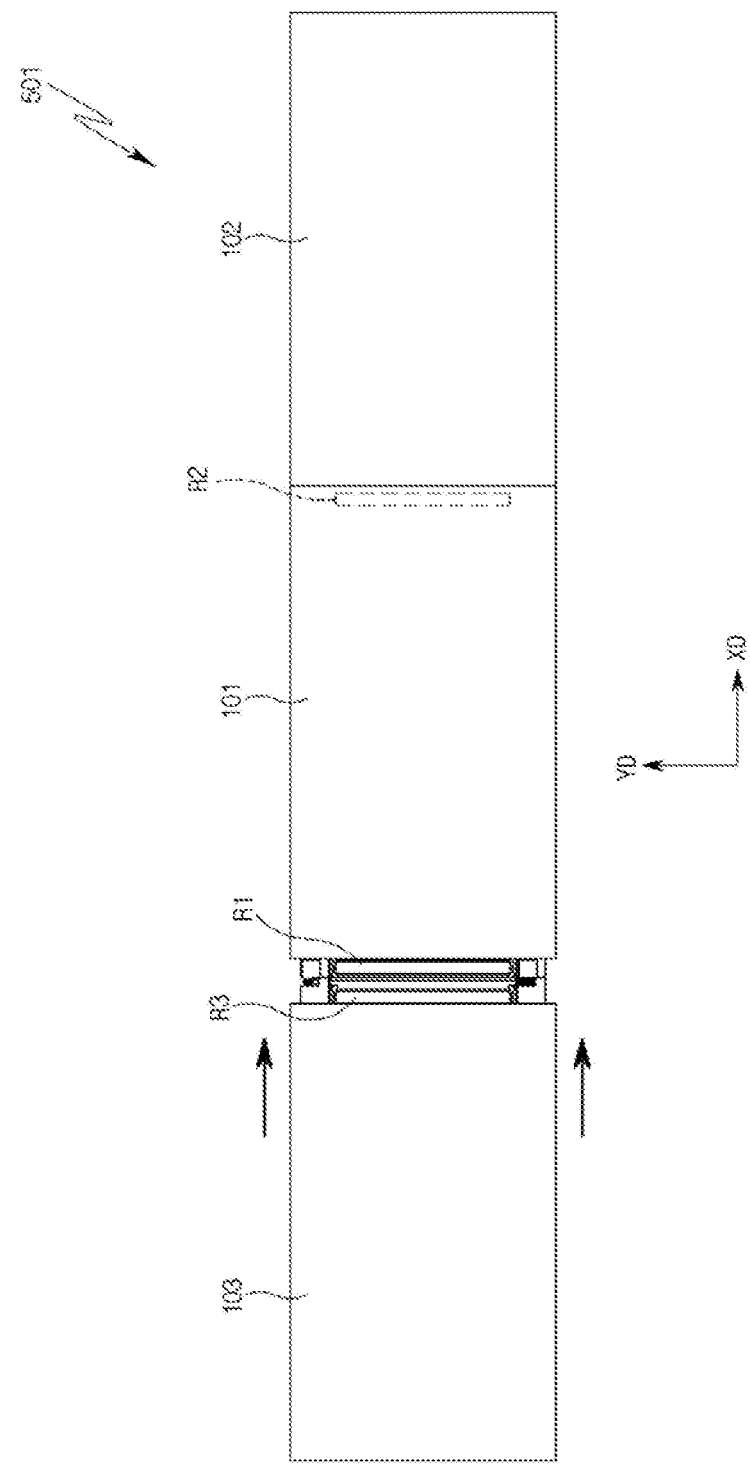
[FIG. 9B]

MULTI-DISPLAY APPARATUS AND METHOD OF INSTALLING THE SAME

CROSS-REFERENCE(S) TO RELATED APPLICATIONS

This application claims the priority benefit of Korean Patent Application No. 10-2018-0116013, filed in the Republic of Korea on Sep. 28, 2018, the disclosure of which is incorporated herein by reference in its entirety.

BACKGROUND OF THE DISCLOSURE

Field of the Disclosure

Exemplary embodiments of the present disclosure relate to a multi-display apparatus and a method of installing the same, and more particularly, to a multi-display apparatus in which a plurality of display modules are arranged in a tile form and a method of installing the same more easily.

Description of the Related Art

When a display apparatus is installed in a public place at which many people are crowded or in a public facility used by many people, a large-scale display apparatus is required due to the nature of a place at which the display apparatus will be installed. A multi-display apparatus is composed of a plurality of displays and driven as if an image is displayed on a single screen so that the multi-display apparatus can effectively provide image information to a large number of people in a public place.

Meanwhile, the multi-display apparatus can be generally implemented by arranging a plurality of multi-display modules in a tile form. When the plurality of multi-display modules are installed in a rear space of the multi-display apparatus, a work space for an operator should be secured in the rear space of the multi-display apparatus so that a wide space is required so as to install the multi-display apparatus in public places or public facilities.

SUMMARY OF THE DISCLOSURE

An object of the present disclosure is to provide a multi-display apparatus capable of being easily installed and dismantled and reducing a space required for installation of the multi-display apparatus.

Another object of the present disclosure is to provide a method of installing a multi-display apparatus, which is capable of easily installing a multi-display apparatus in a front space of the multi-display apparatus.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

Provided herein is a multi-display apparatus including a main frame, a plurality of display modules arranged on the main frame, and a sub-frame coupled to each of the plurality of display modules. The sub-frame can include a rail portion and a hinge portion hingedly-coupled to the main frame.

Each of the plurality of display modules can include a display panel, a back cover coupled to a rear surface of the display panel, and a movement guide fixed to the back cover and coupled to the rail portion to be moved in a sliding manner.

Provided herein is a method of installing a multi-display apparatus including a plurality of arranged display modules, which includes the following operations. A sub-frame hingedly-coupled to a main frame can be hingedly-moved to a front space of the multi-display apparatus. A first display module can be coupled to the hingedly-moved sub-frame in a sliding manner. The sub-frame coupled to the first display module can be hingedly-moved to be arranged parallel to the main frame. The first display module coupled to the sub-frame can be moved in an X-axis direction in a sliding manner.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective view of a multi-display apparatus according to one embodiment of the present disclosure;

FIG. 2 is a perspective view illustrating a rear surface of the multi-display apparatus shown in FIG. 1;

FIG. 3 is an exploded perspective view of a first display module shown in FIG. 2;

FIG. 4A is an exploded perspective view of a first roller, a main frame, and a sub-frame shown in FIG. 2;

FIG. 4B is an exploded plan view showing a coupling relationship between the sub-frame and the first display module;

FIG. 4C is a cross-sectional view taken along line I-I' shown in FIG. 4B;

FIG. 4D is a cross-sectional view taken along line II-II' shown in FIG. 4B;

FIG. 5 is a cross-sectional view of a roller of a multi-display apparatus according to another embodiment of the present disclosure;

FIGS. 6A to 6D are diagrams for describing a method of installing a multi-display apparatus and a method of adjusting a gap between the display modules constituting the multi-display apparatus in an X-axis direction;

FIGS. 7A to 7D are diagrams for describing a method of adjusting a gap between the display modules constituting the multi-display apparatus in a Y-axis direction;

FIGS. 8A and 8B are diagrams for describing a method of adjusting a gap between the display modules constituting a multi-display apparatus according to another embodiment of the present disclosure in a Z-axis direction; and FIGS. 9A and 9B are diagrams for describing a method of arranging a plurality of display modules of the multi-display apparatus according to another embodiment of the present disclosure in an X-axis direction.

DESCRIPTION OF SPECIFIC EMBODIMENTS

Hereinafter, embodiments of the present disclosure will be described in detail with reference to the accompanying drawings. The above objects, features, and advantages of the present disclosure will be understood through the following embodiments with reference to the accompanying drawings. However, the present disclosure is not limited to the embodiments disclosed herein and can be modified in various forms. The embodiments of the present disclosure, which will be described below, are provided to clarify the technical spirit of the present disclosure and also to fully transfer the technical spirit thereof to those skilled in the art to which the present disclosure pertains. Therefore, the scope of the present disclosure should not be construed as being limited to embodiments which will be described below. In the following embodiments and the drawings, the same reference numerals denote the same components.

Further, throughout this disclosure, terms such as a "first," "second," and the like are used not for limitative but for the purpose of distinguishing one component from another component. Furthermore, when a portion of a film, a region, a component, or the like is referred to as being "on" another portion, this includes not only a case in which the portion is "directly on" another portion but also a case in which another film, another region, another component, or the like is interposed between the portion and another portion.

FIG. 1 is a perspective view of a multi-display apparatus according to one embodiment of the present disclosure. FIG. 2 is a perspective view illustrating a rear surface of the multi-display apparatus shown in FIG. 1. FIG. 3 is an exploded perspective view of a first display module shown in FIG. 2. More specifically, FIG. 3 illustrates a rear surface of the first display module.

Hereinafter, referring to FIGS. 1, 2, and 3, a structure of a multi-display apparatus 500 including first, second, third, and fourth display modules 101, 102, 103 and 104 will be described. Components of the multi-display apparatus 500 coupled to the first display module 101 among the first to fourth display modules 101, 102, 103 and 104 will be mainly described, and an overlapping description of the remaining components of the multi-display apparatus 500 coupled to the second to fourth display modules 102, 103 and 104 will be omitted.

Referring to FIGS. 1, 2 and 3, the multi-display apparatus 500 includes the first to fourth display modules 101, 102, 103 and 104, main frames FR1, sub-frames FR2 and rollers R1, R2, R3 and R4.

In the present embodiment, each of the first to fourth display modules 101, 102, 103 and 104 displays an image through a display surface thereof. In the present embodiment, the first to fourth display modules 101, 102, 103 and 104 include a first display module 101, a second display module 102, a third display module 103 and a fourth display module 104. The first to fourth display modules 101, 102, 103 and 104 can be arranged in a tile form in an X-axis direction XD and a Y-axis direction YD. For example, the first to fourth display modules 101, 102, 103 and 104 can be arranged to extend substantially along a same plane, such that each of the first to fourth display modules 101, 102, 103 and 104 are co-planar.

In the present embodiment, the multi-display apparatus 500 is composed of the four display modules 101, 102, 103 and 104, but the present disclosure is not limited to the number of display modules constituting the multi-display apparatus 500 and a method of arranging the display modules. For example, in an alternative embodiment, the number of display modules constituting the multi-display apparatus 500 can be two, three, or five or more, and, in a still alternative embodiment, display modules can be arranged in a single column or row.

In the present embodiment, each of the first to fourth display modules 101, 102, 103 and 104 can be an organic light emitting display module. However, the present disclosure is not limited to the above-described kinds of the first to fourth display modules 101, 102, 103 and 104. For example, in an alternative embodiment, each of the first to fourth display modules 101, 102, 103 and 104 can be a liquid crystal display module.

In the present embodiment, positions of the first to fourth display modules 101, 102, 103 and 104 in the multi-display apparatus 500 are different from each other, but the first to fourth display modules 101, 102, 103 and 104 can have the same structure. Therefore, a structure of the first display module 101 among the first to fourth display modules 101, 102, 103 and 104 will be described, and descriptions of structures of the second to fourth display modules 102, 103 and 104 will be omitted.

In the present embodiment, the first display module 101 includes a first display panel DP1, a back cover BC, and a movement guide GP.

In the present embodiment, the first display panel DP1 can be an organic light emitting display panel. In this case, the first display panel DP1 can include a plurality of pixels, and each of the plurality of pixels can include an anode, a cathode, and an organic light emitting layer disposed between the anode and the cathode and configured to emit light. The first display panel DP1 displays an image using light output from the organic light emitting layer of each of the plurality of pixels in a display direction V1.

The back cover BC is coupled to a rear surface of the first display panel DP1. For example, in the present embodiment, the back cover BC can be fixed to the rear surface of the first display panel DP1 using an adhesive, for example an adhesive resin, which is interposed between the back cover BC and the rear surface of the first display panel DP1. In the present embodiment, the back cover BC can be a plate, for example an iron plate that is responsive to a magnetic force. The back cover BC can support the rear surface of the first display panel DP1 to complement stiffness of the first display panel DP1 (e.g., the back cover BC can support surface of the display panel DP1 to improve stiffness of the display module).

The movement guide GP is fixed to the back cover BC. The movement guide GP is a component coupled to the sub-frame FR2 and is configured to allow the first display module 101 to be moved in the X-axis direction XD. In the present embodiment, the movement guide GP includes a first guide portion G1 and a second guide portion G2. Each of the first guide portion G1 and the second guide portion G2 has a shape extending in the X-axis direction XD. The first guide portion G1 can be spaced apart from the second guide portion G2 to be disposed parallel thereto.

In the present embodiment, the first guide portion G1 can be coupled to a first rail RL1 of the sub-frame FR2 in a sliding manner to be moved along the first rail RL1. Further, the second guide portion G2 of the movement guide GP can be coupled to a second rail RL2 of the sub-frame FR2 in a sliding manner to be moved along the second rail RL2. Accordingly, the first display module 101 having the first and second guide portions G1 and G2 can be moved in the X-axis direction XD along the first and second rails RL1 and RL2, respectively in a sliding manner. For example, the first and second guide portions G1 and G2 can slide along the first and second rails, respectively to assemble the respective display module 101, 102, 103 and 104 to the respective sub-frame FR2.

A respective main frame FR1 is disposed on the rear surface of each of the first to fourth display modules 101, 102, 103 and 104 to support the first to fourth display modules 101, 102, 103 and 104. In the present embodiment, in the first and second display modules 101 and 102, the respective main frame FR1 includes a first frame F1 and a second frame F2. Each of the first frame F1 and the second frame F2 extends in the X-axis direction XD and have a shape crossing the rear surfaces of the respective display module 101, 102, 103 and 104. For example, the first frame F1 and the second frame F2 extend substantially an entire length of the respective display module 101, 102, 103 and 104. Further, the first frame F1 can be spaced apart from the second frame F2 to be parallel thereto (e.g., the first frame F1 can be parallel to the second frame F2, where each of the first and second frames F1, F2 can extend along the X-axis direction XD).

In the present embodiment, each of the first frame F1 and the second frame F2 can have a structure of being divided into two frames to correspond to a boundary between the first and second display modules 101 and 102. Alternatively, each of the first frame F1 and the second frame F2 can have a shape of being integrally formed over the respective display module.

In the present embodiment, the main frame FR1 can be coupled to a mounting device fixed to a wall surface so that the multi-display apparatus 500 can be mounted on the wall surface, or the main frame FR1 can be coupled to another mounting device installed on the ground so that the multi-display apparatus 500 can be installed on the ground.

The sub-frame FR2 is coupled to the first display module 101, the main frame FR1, and the first roller R1. The sub-frame FR2 is a component for allowing the first display module 101 to be easily installed in the multi-display apparatus 500. More specifically, the sub-frame FR2 has a structure of being capable of being coupled to the main frame FR1 and the first roller R1 to be detachably coupled to the first display module 101. Accordingly, the first display module 101 is detachably coupled to the multi-display apparatus 500 through the sub-frame FR2 such that assembly or disassembly of the first display module 101 can be facilitated in the multi-display apparatus 500.

In the present embodiment, rollers R1, R2, R3 and R4 can include the first roller R1, the second roller R2, the third roller R3 and the fourth roller R4. Each of the first to fourth rollers R1, R2, R3 and R4 has a magnetic property (e.g., the rollers R1, R2, R3 and R4 can be magnetic). Each of the rollers R1, R2, R3 and R4 are connected to a respective one of the display modules 101, 102, 103 and 104. Further, in a state in which the first to fourth rollers R1, R2, R3 and R4 are each coupled to the respective sub-frame FR2, each of the first to fourth rollers R1, R2, R3 and R4 is magnetically coupled to a back cover BC of a corresponding one among the first to fourth display modules 101, 102, 103 and 104.

Therefore, the first to fourth display modules 101, 102, 103 and 104 are disposed on the first to fourth rollers R1, R2, R3 and R4, respectively, such that there is an effect in that the first to fourth display modules 101, 102, 103 and 104 can be fixed in a Z-axis direction ZD by the magnetic properties of the first to fourth rollers R1, R2, R3 and R4. The Z-axis direction ZD is perpendicular to the X-axis direction XD and to the Y-axis direction YD.

Further, in a state in which the first to fourth rollers R1, R2, R3 and R4 are magnetically coupled to the first to fourth display modules 101, 102, 103 and 104, respectively, when the second display module 102 is pulled in the Z-axis direction ZD from a front surface of the multi-display apparatus 500, e.g., as in the second display module 102 shown in FIGS. 1 and 2, a coupling between the second display module 102 and a roller R2 magnetically coupled thereto is released such that a state in which the second display module 102 is tilted toward the front surface of the multi-display apparatus 500 can be implemented.

Meanwhile, when the second display module 102 is tilted in a front surface direction of the multi-display apparatus 500, a display panel provided in the second display module 102 is moved in the front surface direction of the multi-display apparatus 500 in the above-described rail manner such that the display panel of the second display module 102 can be easily separated from the multi-display apparatus 500 or be easily installed in the multi-display apparatus 500.

In the present embodiment, the four rollers R1, R2, R3 and R4 are provided to correspond to the four display modules 101, 102, 103 and 104 in the multi-display apparatus 500, but a larger number of rollers can also be installed. In this case, two or more rollers can be provided to correspond to each of the first to fourth display modules 101, 102, 103 and 104. The two or more rollers can be arranged to be spaced apart from each other in a path through which each of the first to fourth display modules 101, 102, 103 and 104 is moved in the X-axis direction XD in a sliding manner in the multi-display apparatus 500.

Hereinafter, the components of the multi-display apparatus 500 will be described in more detail with reference to FIGS. 4A to 4D.

FIG. 4A is an exploded perspective view of the first roller R1, the main frame FR1, and the sub-frame FR2 which are shown in FIG. 2, FIG. 4B is an exploded plan view showing a coupling relationship between the sub-frame FR2 and the first display module 101, FIG. 4C is a cross-sectional view taken along line I-I' shown in FIG. 4B, and FIG. 4D is a cross-sectional view taken along the line II-II' shown in FIG. 4B. Each of the first to fourth display modules 101, 102, 103 and 104 can be coupled to the main frame FR1 and the sub-frame FR2 in the manner shown in FIGS. 4A and 4B and described below.

Referring to FIGS. 2 and 4A to 4D, in the present embodiment, the sub-frame FR2 includes a hinge portion HG1, the first rail RL1, the second rail RL2, and an auxiliary frame AF.

The hinge portion HG1 is hingedly-coupled to the main frame FR1. More specifically, the hinge portion HG1 has a hinge shaft HX, a first end portion E1 of the hinge shaft HX is accommodated in a first coupling hole HL1 formed in the first frame F1 of the main frame FR1, and a second end portion E2 of the hinge shaft HX is accommodated in a second coupling hole HL2 formed in the second frame F2 of the main frame FR1. Therefore, the hinge portion HG1 is hingedly-coupled to the main frame FR1 about the hinge shaft HX.

In the present embodiment, a screw thread is formed on an outer surface of the first end portion E1 of the hinge shaft HX. The first end portion E1 coupled to the first frame F1 by passing through the first coupling hole HL1 is screw-coupled to a nut NT. As the nut NT is rotated, the first end portion E1 of the hinge shaft HX can be tightened to the first frame F1.

Further, the second end portion E2 of the hinge shaft HX is accommodated in the second coupling hole HL2 to be coupled to the second frame F2. A spring SP is coupled to the second end portion E2. More specifically, the spring SP has a shape extending to surround a circumference of the second end portion E2. That is, in a state of being inserted into the spring SP, the second end portion E2 is accommodated in the second coupling hole HL2. Thus, the spring SP can be stretched or contracted in the Y-axis direction YD between the hinge portion HG1 and the second frame F2.

The first rail RL1 is connected to one side of the hinge portion HG1 to have a shape extending parallel to the first frame Fl, and the second rail RL2 is connected to the other side of the hinge portion HG1 to have a shape extending parallel to the second frame F2. That is, each of the first rail RL1 and the second rail RL2 has a shape extending in the X-axis direction XD, and the first and second rails RL1 and RL2 are spaced apart from each other. Further, the first rail RL1 is connected to a first side of the hinge portion HG1, and the second rail RL2 is connected to a second side of the hinge portion HG2, the first side of the hinge portion HG1 being opposite to the second side of the hinge portion HG2.

In the present embodiment, when the main frame FR1 is viewed in a plan view, the first rail RL1 and the second rail RL2 can be located between the first frame F1 and the second frame F2. Consequently, when the sub-frame FR2 is hingedly-moved with respect to the main frame FR1, interference between the sub-frame FR2 and the main frame FR1 can be prevented.

In the present embodiment, the first rail RL1 and the second rail RL2 correspond one-to-one to be coupled to the first guide portion G1 and the second guide portion G2 of the first display module 101 in a sliding manner. More specifically, as shown in FIG. 4C, when the first rail RL1 and the first guide portion G1 are viewed in cross-sectional view, the first guide portion G1 includes a protrusion protruding toward the first rail RL1, and an accommodation groove for accommodating the protrusion of the first guide portion G1 is formed in the first rail RL1 so that the first rail RL1 and the first guide portion G1 can be coupled in a sliding manner. For example, each of the first and second guide portions G1, G2 can have a T-shape cross-sectional shape that engages a groove of the first and second rails RL1, RL2, respectively. Thus, the groove of the first and second rails RL1, RL2 has a shape corresponding to the first and second guide portions, respectively. Further, each guide portion G1, G2 can have a section of which is disposed above the first and second rails RL1, RL2, respectively.

Alternatively, the first rail RL1 includes a protrusion protruding toward the first guide portion G1, and an accommodation groove for accommodating the protrusion of the first rail RL1 is formed in the first guide portion G1 so that the first rail RL1 and the first guide portion G1 can be coupled in a sliding manner. Similarly, the second rail RL2 can include a protrusion protruding toward the second guide portion G2, and an accommodation groove for accommodating the protrusion of the second rail RL2 is formed in the second guide portion G2 so that the second rail RL2 and the second guide portion G2 can be coupled in a sliding manner.

Owing to structures of the first and second guide portions G1 and G2, the first display module 101 can be moved on the sub-frame FR2 in a sliding manner. Accordingly, the first display module 101 can be easily moved in the X-axis direction XD in a state of being coupled to the sub-frame FR2.

The auxiliary frame AF is adjacent to the hinge portion HG1 to connect the first rail RL1 to the second rail RL2. In the present embodiment, the auxiliary frame AF can have a shape extending in the Y-axis direction YD to cross the first and second rails RL1 and RL2. In addition, the auxiliary frame AF is spaced apart from the hinge portion HG1 in the X-axis direction XD so that a space for accommodating the first roller R1 can be defined between the hinge portion HG1 and the auxiliary frame AF.

The first roller R1 is accommodated in the space between the hinge portion HG1 and the auxiliary frame AF to be coupled to the sub-frame FR2. More specifically, a first roller hole RH1 is formed on an inner surface of the first rail RL1 to accommodate one end portion of a rotating shaft of the first roller R1, and a second roller hole RH2 is formed on an inner surface of the second rail RL2 to accommodate the other end portion of the rotating shaft of the first roller R1. Further, the rotating shaft of the first roller R1 is accommodated to be rotatable with respect to the first and second roller holes RH1 and RH2 such that the first roller R1 can be freely rotated by an external force.

In the present embodiment, the first roller R1 has a magnetic property (e.g., the first roller may be magnetic). Therefore, as described above, when the back cover BC formed of steel is coupled to the rear surface of the first display panel DP1, the back cover BC is coupled to the first roller R1 due to a magnetic force of the first roller R1 so that the first display module 101 can be easily fixed to the first roller R1 due to the magnetic force. On the other hand, when the first display module 101 is pulled out, the magnetic force coupling between the first display module 101 and the first roller R1 is released so that the first display module 101 can be easily separated from the first roller R1.

FIG. 5 is a cross-sectional view of a roller of a multi-display apparatus according to another embodiment of the present disclosure. A position of the cross-section of the multi-display apparatus shown in FIG. 5 can correspond to that of the cross-section of the multi-display apparatus shown in FIG. 4D. Further, in a description of FIG. 5, the same reference numerals are assigned to the same components described in the above embodiments, and an overlapping description thereof will be omitted.

Referring to FIG. 5, a first roller R1-1 is magnetic, and the back cover BC of the first display module 101 is coupled to the first roller R1-1 due to a magnetic force of the first roller R1-1.

In the embodiment described above with reference to FIG. 4C, the cross-section of the first roller R1 of FIG. 4D has a constant diameter in a circumferential direction. On the other hand, in the embodiment shown in FIG. 5, the first roller R1-1 can have different cross-sectional diameters in the circumferential direction.

For example, in the embodiment shown in FIG. 5, a cross-section of the first roller R1-1 can have an elliptical shape so that the cross-section of the first roller R1-1 has a first diameter D1 and a second diameter D2 that is greater than the first diameter D1. Thus, when the first diameter D1 of the first roller R1-1 is aligned in the Z-axis direction ZD, a height at which the first roller R1-1 supports the first display module 101 can be substantially equal to a length of the first diameter D1. On the other hand, when the second diameter D2 of the first roller R1-1 is aligned in the Z-axis direction ZD, the height at which the first roller R1-1 supports the first display module 101 can be substantially equal to a length of the second diameter D2.

Consequently, the first roller R1-1 supporting the rear surface of the first display module 101 is rotated and a diameter of the first roller R1-1 aligned in the Z-axis direction ZD is adjusted such that a height at which the first display module 101 is supported by the first roller R1-1 can be adjusted. Thus, for example, when a height of the first display module 101 is lower than that of the second display module 102 of FIG. 1 adjacent to the first display module 101, the first roller R1-1 is rotated such that the height at which the first display module 101 is supported by the first roller R1-1 can be increased. Consequently, a gap between the first display module 101 and the second display module 102 of FIG. 1 in the Z-axis direction ZD can be reduced or easily implemented to be zero substantially. For example, the height of each of the first and second display modules 101, 102 can be adjusted, via the corresponding roller, to be the same, such that the first and second display modules 101, 102 are coplanar.

Hereinafter, a method of installing the multi-display apparatus having the above-described structure, and a method of adjusting gaps between the display modules constituting the multi-display apparatus in the X-axis, Y-axis, and Z-axis directions will be described.

FIGS. 6A to 6D are illustrations for describing a method of installing a multi-display apparatus and a method of adjusting a gap between the display modules constituting the multi-display apparatus in an X-axis direction.

Meanwhile, in a description of FIGS. 6A to 6D, the same reference numerals are assigned to the same components of the multi-display apparatus described in the above embodiments, and an overlapping description thereof will be omitted. Further, a method of installing the first and second display modules 101 and 102 can be similar to that of installing the third and fourth display modules 103 and 104 of FIG. 1 so that the method of installing the first and second display modules 101 and 102 will be illustratively described below and a description of the method of installing the third and fourth display modules 103 and 104 of FIG. 1 will be omitted.

Referring to FIG. 6A, when the first and second display modules 101 and 102 constituting the multi-display apparatus are assumed as being installed on the ground and viewed in a plan view, the method of installing the first and second display modules 101 and 102 is illustrated in FIG. 6A.

First, as shown in FIG. 6A, when the first and second display modules 101 and 102 are installed substantially perpendicular to the ground, an installation surface SS of the first and second display modules 101 and 102 can be defined, a front space S1 of the first and second display modules 101 and 102 can be defined based on the installation surface SS, and a rear space S2 of the first and second display modules 101 and 102 can be defined based on the installation surface SS. In this case, in order to install the first and second display modules 101 and 102, the main frame FR1 is installed in the rear space S2.

Further, as described above with reference to FIGS. 4A and 4B, each sub-frame FR2 is provided in each of spaces in which the first and second display modules 101 and 102 are installed to be engaged with the main frame FR1. Thus, as the sub-frame FR2 is engaged with the respective main frame FR1, and a preparation of a work for permitting installation of the first and second display modules 101 and 102 is completed.

Thereafter, the hinge portion HG1 of the sub-frame FR2 is hingedly-moved in a direction toward the front space S1 with respect to the main frame FR1. Consequently, a space between the main frame FR1 and the sub-frame FR2 is open in the front space S1 so that the first rail RL1 and the second rail RL2 in FIG. 4A of the sub-frame FR2 are exposed in the front space S1.

The first display module 101 prepared in the front space S1 is coupled to the sub-frame FR2. More specifically, as described above with reference to FIGS. 4A to 4C, the first guide portion G1 and the second guide portion G2 of FIG. 4A, which are located on the rear surface of the first display module 101 correspond one-to-one to be coupled to the first rail RL1 and the second rail RL2, respectively of FIG. 4A of the sub-frame FR2 in a sliding manner. Accordingly, the first display module 101 can be moved along the sub-frame FR2 in a sliding manner.

When a coupling of the first display module 101 to the sub-frame FR2 is completed, the hinge portion HG1 of the sub-frame FR2 is hingedly-moved in a direction toward the rear space S2 with respect to the main frame FR1. Consequently, the space between the main frame FR1 and the sub-frame FR2, which is open to the front space S1, is closed, and when viewed in a plan view, the first display module 101 is disposed in parallel with the main frame FR1 and the sub-frame FR2.

Further, in the same manner as the first display module 101, the second display module 102 is coupled to the main frame FR1. Therefore, as shown in FIGS. 6B and 6C, when viewed in a plan view, the first and second display modules 101 and 102 can be arranged in parallel to the main frame FR1 in the X-axis direction XD.

In the present embodiment, a separating operation of the first display module 101 from the main frame FR1 and the sub-frame FR2 can be performed according to a reverse order of the above-described installing operation of the first display module 101.

Meanwhile, the above-described installing and separating operations of the first display module 101 can be performed in the front space S1. Unlike the present embodiment of the present disclosure, when the installing and separating operations of the display modules are performed in the rear space S2, a dimension of the rear space S2 can be increased in consideration of an accommodation space of an operator, and thus a dimension of an overall space required for installing the multi-display apparatus can be increased.

However, in the above-described present embodiment of the present disclosure, since the installing and separating operations of the first display module 101 and another display modules are performed in the front space S1, the dimension of the overall space required for installing the multi-display apparatus can be reduced. Further, an operation of replacing a specific display among the display modules 101, 102, 103 and 104 constituting the multi-display apparatus in the front space S1 can be easily performed. For example, when the first display module 101 among the display modules 101, 102, 103 and 104 is to be replaced, the sub-frame FR2 coupled to the first display module 101 is hingedly-moved to the front space S1, and then the first display module 101 is moved to the sub-frame FR2 in a sliding manner so that a separating operation of the first display module 101 can be easily performed in the front space S1.

Referring to FIGS. 6B, 6C, and 6D, FIG. 6B illustrates the first and second display modules 101 and 102 when the main frame FR1 is viewed in a front view, and FIG. 6C illustrates the first and second display modules 101 and 102 when the main frame FR1 is viewed in a plan view. FIG. 6D is an enlarged view of a portion of FIG. 6C that illustrates an incised state of a portion of the main frame FR1 so as to show the second roller R2.

After each of the first and second display modules 101 and 102 is coupled to the sub-frame FR2 of FIG. 6A, an X-axis arrangement operation of arranging the first and second display modules 101 and 102 in the X-axis direction XD and an operation of adjusting a first gap GP1 between the first and second display modules 101 and 102 in the X-axis direction XD are performed.

First, when the second display module 102 is assumed as being located at a correct position, the X-axis arrangement operation can be performed by moving the first display module 101 in the X-axis direction XD. In the present embodiment, the X-axis arrangement operation can be performed through sliding movement of the first display module 101 due to the coupling between the sub-frame FR2 of FIG. 6A and the first display module 101, which is described above with reference to FIG. 6A, in a sliding manner.

Further, as shown in FIG. 6D, when the sliding movement of the first display module 101 is performed, the first roller R1 and the second roller R2 can be rotated to correspond to the sliding movement of the first display module 101. Consequently, the sliding movement of the first display module 101 in the X-axis direction XD can be more easily performed by the first and second rollers R1 and R2.

Meanwhile, according to the X-axis arrangement operation of the first display module 101 in accordance with the above-described method, an operation of minimizing the first gap GP1 between the first and second display modules 101 and 102 in the X-axis direction XD can be easily performed.

When the X-axis alignment between the first and second display modules 101 and 102 is completed and then the back cover BC of the first display module 101 is disposed on the second roller R2, the first display module 101 is coupled to the second roller R2 due to the magnetic force of the second roller R2. In this case, when viewed in cross-sectional view, the rear surface of the first display module 101 is fixed to the second roller R2 in the Y-axis direction YD due to the magnetic force of the second roller R2, and, when viewed in a plan view, an effect in that one side of the first display module 101 is fixed to the second roller R2 occurs due to the magnetic force of the second roller R2.

Further, the coupling between the second roller R2 and the first display module 101 due to the magnetic force can be released by a force of the operator pulling the first display module 101 in a direction opposite the magnetic force. Consequently, as shown in FIG. 6A, when the coupling between one side of the first display module 101 and the second roller R2 due to the magnetic force is released, a state in which the other side of the first display module 101 is hingedly-moved to the front space S1 can be implemented.

FIGS. 7A to 7D are diagrams for describing a method of adjusting a gap between the display modules constituting the multi-display apparatus in a Y-axis direction.

Referring to FIGS. 7A and 7B, as described above with reference to FIG. 6D, after the alignment operation between the first and second display modules 101 and 102 in the X-axis direction XD and the operation of adjusting the first gap GP1 in the X-axis direction XD are completed, an operation of adjusting a second gap GP2 between the first and second display modules 101 and 102 in the Y-axis direction YD is performed.

For example, the second gap GP2 between facing upper edges of the first and second display modules 101 and 102 in the Y-axis direction YD can occur in a first area A1. The second gap GP2 induces occurrence of a gap not only between the first and second display modules 101 and 102 but also between the other display modules 103 and 104 adjacent to the first and second display modules 101 and 102 in the Y-axis direction YD so that an operation of minimizing the second gap GP2 is necessary so as to improve display quality of the multi-display apparatus.

Referring to FIGS. 7C and 7D, in the present embodiment, the second gap GP2 can be adjusted using the nut NT coupled to the hinge shaft HX.

As described above with reference to FIGS. 4A and 4B, the hinge portion HG1 of the sub-frame FR2 has the hinge shaft HX, the screw thread as a bolt is formed on the outer surface of the first end portion E1 of the hinge shaft HX, and the nut NT is screw-coupled to the first end portion E1 of the hinge shaft HX. Further, the second end portion E2 of the hinge shaft HX is coupled to the spring SP which is able to be stretched or contracted between the hinge portion HG1 and the second frame F2 of the main frame FR1 in the Y-axis direction YD. The spring SP applies a force to the hinge portion HG1 in the Y-axis direction YD.

According to the above-described configurations of the hinge shaft HX of hinge portion HG1 and the nut NT, when the nut NT is rotated and thus the first end portion E1 of the hinge shaft HX is fastened to the first frame F1 of the main frame FR1, a degree of contraction of the spring SP in the Y-axis direction YD is increased and, simultaneously, the hinge portion HG1 is shifted in a downward direction. As a result, a separation distance between the second frame F2 and the hinge portion HG1 of the sub-frame FR2 in the Y-axis direction YD can be reduced from a first length L1 to a second length L2.

That is, when the nut NT coupled to the first end portion E1 of the hinge shaft HX is rotated, a clearance between the main frame FR1 and the sub-frame FR2 is varied, and since the main frame FR1 is in a fixed state, there can occur an effect in that the sub-frame FR2 is shifted in the Y-axis direction YD in response to the rotation operation of the nut NT. Further, as described above, since the first display module 101 is coupled to the sub-frame FR2, the first display module 101 can be shifted in the Y-axis direction YD due to the shift effect of the sub-frame FR2 in the Y-axis direction YD resulting from the above-described rotation of the nut NT. Consequently, a position of the first display module 101 with respect to the second display module 102 is controlled using the nut NT such that the second gap GP2 between the first and second display modules 101 and 102 in the Y-axis direction YD can be easily adjusted.

FIGS. 8A and 8B are diagrams for describing a method of adjusting a gap between the display modules constituting a multi-display apparatus according to another embodiment of the present disclosure in the Z-axis direction.

Referring to FIGS. 8A and 8B, a second roller R2-1 supports the rear surface of the back cover BC of the first display module 101, and the first display module 101 is coupled to the second roller R2-1 due to a magnetic property of the second roller R2-1.

Like the first roller R1-1 of FIG. 5 described above with reference to FIG. 5, in the present embodiment, when viewed the second roller R2-1 in cross-sectional view, the second roller R2-1 can have different cross-sectional diameters in the circumferential direction. More specifically, a cross-section of the second roller R2-1 can have an elliptical shape so that the cross-section of the second roller R2-1 has a first diameter D1 and a second diameter D2 that is greater than the first diameter D1.

Thus, when the first diameter D1 of the second roller R2-1 is aligned in the Z-axis direction ZD, a first height at which the second roller R2-1 supports the first display module 101 is defined, and when the second diameter D2 of the second roller R2-1 is aligned in the Z-axis direction ZD, a second height at which the second roller R2-1 supports the first display module 101 can be higher than the first height. Further, since a circumferential surface of the second roller R2-1 has a round shape, a height at which the second roller R2-1 supports the first display module 101 can have a value between the first diameter D1 and the second diameter D2 according to a rotated shape of the second roller R2-1. For example, since the second roller R2-1 attached to the first display module 101 has an elliptical shape, rotation of the second roller R2-1 will cause the first display module 101 to move vertically corresponding to the height of the second roller R2-1.

Meanwhile, as shown in FIG. 8A, when a step occurs between a main frame FR1-1 supporting the first display module 101 and a main frame FR1-2 supporting the second display module 102, a third gap GP3 can occur between the first and second display modules 101 and 102 in the Z-axis direction ZD.

As shown in FIG. 8B, when the third gap GP3 occurs between the first and second display modules 101 and 102, the second roller R2-1 is rotated such that the height at which the second roller R2-1 supports the first display module 101 can be adjusted. Consequently, an effect in which the first display module 101 of the first and second display modules 101 and 102 is selectively ascended in the Z-axis direction ZD using the second roller R2-1 can occur such that the third gap GP3 can be minimized or implemented to be zero substantially. For example, the third gap GP3 between the first and second display modules 101, 102 can be adjusted via the second roller R2-1 of the first display module 101, such that the third gap GP3 is zero and the first and second display modules are coplanar.

FIGS. 9A and 9B are diagrams for describing a method of arranging a plurality of display modules of the multi-display apparatus according to another embodiment of the present disclosure in an X-axis direction XD.

Referring to FIGS. 9A and 9B, as described above with reference to FIGS. 6A to 6D, the first and second display modules 101 and 102 are arranged in the X-axis direction XD. Further, in this case, as shown in FIG. 7A, as the first and second display modules 101 and 102 are arranged in the X-axis direction XD, a first roller R1 located on one side of the first display module 101 can be exposed to the outside.

The exposed first roller R1 can be used to fix another display module adjacent to the first display module 101. Alternatively, in order to prevent the first roller R1 from being visible from the outside, it can be required to cover the first roller R1 using a separate side bezel.

In the present embodiment, the third display module 103 adjacent to the first display module 101 and located at an outermost side of a multi-display apparatus 501 can be further installed. More specifically, in the embodiment shown in FIGS. 9A and 9B, a configuration for installing the third display module 103 in the multi-display apparatus 501 can be installed reversely by 180 degrees as compared with the configuration for installing each of the first and second display modules 101 and 102. Accordingly, a separation distance between the first roller R1 and a third roller R3 can be less than a separation distance between the first roller R1 and a second roller R2. The first roller R1 and the second roller R2 are approximately spaced apart from each other by a length of a long side of the first display module 101, whereas the first roller R1 and the third roller R3 are disposed to be adjacent to each other.

Further, the hinge movement direction between the main frame FR1 and the sub-frame FR2 for installing the first display module 101 shown in FIG. 6A is counterclockwise, whereas the configuration for installing the third display module 103 located at the outermost side of the multi-display apparatus 501 is reversed by 180 degrees such that a hinge movement direction between a main frame FR1 and a sub-frame FR2 for installing the third display module 103 can be clockwise.

Meanwhile, as described above, after installation of the third display module 103 on the main frame FR1 and the sub-frame FR2 is completed, the third display module 103 is moved in the X-axis direction XD to be aligned with the first and second display modules 101 and 102.

Meanwhile, since the first and third rollers R1 and R3 are disposed to be adjacent to each other, there can occur an effect in that the third display module 103 is fixed to the first and third rollers R1 and R3 due to magnetic forces of the first roller R1 and the third roller R3.

Further, in the present embodiment, since the roller located at the outermost side of the multi-display apparatus 501 is covered by the display modules, there is no need of a configuration of a separate side bezel for covering a roller which is disposed at the outermost side of the multi-display apparatus 501 and exposed to the outside. Consequently, there can occur an effect in that the configuration of the multi-display apparatus 501 is more simplified and, at the same time, appearance of an image displayed on the multi-display apparatus 501 is more aesthetic.

According to the embodiments of the present disclosure, an operation of installing or separating a display module of a multi-display apparatus can be performed in a front space of the multi-display apparatus. Consequently, the operation of installing the display module of the multi-display apparatus can be more facilitated, and after the installation of the multi-display apparatus is completed, it can be easy to selectively replace a specific display module in the front space of the multi-display apparatus.

Further, since the operation of installing or separating the display module of the multi-display apparatus is performed in the front space of the multi-display apparatus, it is not necessary to secure a work space of an operator in a rear side of the multi-display apparatus. Consequently, there is an effect in which a dimension of a space required for installing the multi-display apparatus is reduced.

According to the embodiments of the present disclosure, each of the gaps between the display modules in X-, Y-, and Z-axis directions can be easily adjusted by manipulating components provided in the multi-display apparatus. Consequently, a size of the gap between the display modules can be reduced or easily implemented to be zero substantially such that display quality of the multi-display apparatus can be improved.

Further, since the gap between the display modules is reduced using the components provided in the multi-display apparatus, frames installed on front surfaces of the display modules for preventing occurrence of the gap between the display modules can be omitted.

Although the description has been made with reference to the embodiments of the present disclosure, it should be understood that various alternations and modifications of the present disclosure can be devised by those skilled in the art to which the present disclosure pertains without departing from the spirit and scope of the present disclosure, which are defined by the appended claims.

What is claimed is:

1. A multi-display apparatus comprising:
   a plurality of main frames;
   a plurality of display modules; and
   a plurality of sub-frames, each sub-frame being coupled to a respective one of the plurality of display modules and each sub-frame including a rail portion and a hinge portion hingedly-coupled to a respective one of the plurality of main frames,
   wherein each of the plurality of display modules is attached to a respective main frame among the plurality of main frames via a respective sub-frame among the plurality of sub-frames, and
   wherein each of the plurality of display modules includes:
   a display panel;
   a back cover coupled to a rear surface of the display panel; and
   a movement guide fixed to the back cover and coupled to the rail portion of the respective sub-frame, wherein each movement guide is movable with respect to the rail portion of the respective sub-frame.

2. The multi-display apparatus of claim 1, further comprising:
a plurality of rollers, each roller being magnetic and being coupled to a respective sub-frame,
wherein each back cover is disposed on the respective roller and is coupled to the respective roller due to a magnetic force of the respective roller.

3. The multi-display apparatus of claim 2, wherein each main frame includes:
a first frame hingedly-coupled to a first end portion of a hinge shaft of the hinge portion of the respective sub-frame; and
a second frame hingedly-coupled to a second end portion of the respective hinge shaft,
the first frame and the second frame of each main frame has a shape extending in a direction the respective display module is arranged, and
the first frame and the second frame of each main frame are parallel to each other.

4. The multi-display apparatus of claim 3, further comprising:
a nut engaged with a screw thread defined on an outer surface of the first end portion of each hinge shaft, each nut being configured to couple the respective hinge shaft to the respective first frame; and
a spring having a shape extending to surround a circumference of the second end portion of each hinge shaft, each spring being configured to stretch or contract between the respective hinge portion and the respective second frame.

5. The multi-display apparatus of claim 3, wherein each rail portion includes:
a first rail connected to a first end of the respective hinge portion and having a shape extending parallel to the respective first frame; and
a second rail connected to a second end of the respective hinge portion and having a shape extending parallel to the respective second frame, and
each movement guide includes:
a first guide portion coupled to the respective first rail; and
a second guide portion coupled to the respective second rail.

6. The multi-display apparatus of claim 5, wherein each first rail and each second rail are located between the respective first frame and the respective second frame.

7. The multi-display apparatus of claim 5, wherein each roller crosses the respective first rail and the respective second rail and is coupled to the respective first rail and the respective second rail.

8. The multi-display apparatus of claim 7, wherein each sub-frame further includes an auxiliary frame adjacent to the respective hinge portion and configured to cross the respective first rail and the respective second rail, and
the respective roller is disposed between the respective hinge portion and the respective auxiliary frame.

9. The multi-display apparatus of claim 2, wherein each roller has different cross-sectional diameters in a circumferential direction.

10. A method of installing a multi-display apparatus including a plurality of arranged display modules, the method comprising:
rotating a first sub-frame in a first direction towards a front space of the multi-display apparatus, the first sub-frame being hingedly-coupled to a first main frame;
coupling a first display module to the rotated first sub-frame by sliding the first display module with respect to the first sub-frame;
rotating the first sub-frame coupled to the first display module in a second direction until the first sub-frame is parallel to the first main frame, the second direction being opposite to the first direction; and
moving the first display module coupled to the first sub-frame in an X-axis direction in a sliding manner.

11. The method of claim 10, wherein the multi-display apparatus includes a plurality of display modules, the plurality of display modules including the first display module, and
wherein a hinge movement direction of a display module among the plurality of display modules installed at an outermost side of the multi-display apparatus is opposite a hinge movement direction of another display module among the plurality of display modules adjacent to the display module in the X-axis direction.

12. The method of claim 10, further comprising:
sliding the first display module over a first roller coupled to the first sub-frame and adjusting an X-axis direction gap between the first display module and a second display module adjacent to the first display module in the X-axis direction.

13. The method of claim 12, wherein the first roller is magnetic, and a first back cover is coupled to a rear surface of the first display module so that the first display module is fixed to the first roller via magnetic attraction to the first roller.

14. The method of claim 12, further comprising:
screw-coupling a first hinge shaft to a first nut, the first hinge shaft being provided in the first sub-frame and passing through the first main frame; and
shifting the first sub-frame in a Y-axis direction due to rotation of the nut and adjusting a gap between the first and second display modules in the Y-axis direction, the Y-axis direction being perpendicular to the X-axis direction.

15. The method of claim 12, further comprising:
rotating the first roller having different cross-sectional diameters in a circumferential direction to vary a height in a Z-axis direction at which the first display module is supported by the first roller, the Z-axis direction being perpendicular to the X-axis direction; and
adjusting a gap between the first and second display modules in the Z-axis direction.

16. The method of claim 12, wherein the second display module is attached to a second roller of a second sub-frame, the second sub-frame being attached to a second main frame, and
wherein the method further comprises rotating the first and second rollers to adjust the height of the first and second display modules until the first display module is coplanar with the second display module.

17. The method of claim 12, wherein the multi-display apparatus includes a plurality of display modules, and
wherein the second display module among the plurality of display modules is coupled to the first display module via magnetic attraction to the first roller.

18. The method of claim 17, wherein the second display module includes first and second guide rails extending along a length of the second display module,
wherein the method further comprises:
sliding the first and second guide rails of the second display module into first and second rails of a second sub-frame.

19. The method of claim 18, wherein the second sub-frame further includes a hinge portion, and
wherein the method further comprises fastening the hinge portion of the second sub-frame to a second main frame.

20. The method of claim 19, wherein the second sub-frame is rotatable with respect to the second main frame via the hinge portion of the second sub-frame.

\* \* \* \* \*